US008843954B2

(12) United States Patent
Guo et al.

(10) Patent No.: US 8,843,954 B2
(45) Date of Patent: Sep. 23, 2014

(54) INFORMATION TRANSMISSION METHOD, SYSTEM AND DATA CARD

(75) Inventors: Shiliang Guo, Shenzhen (CN); Longan Xiao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 30 days.

(21) Appl. No.: 13/699,917

(22) PCT Filed: Aug. 17, 2010

(86) PCT No.: PCT/CN2010/076049
§ 371 (c)(1),
(2), (4) Date: Dec. 11, 2012

(87) PCT Pub. No.: WO2011/147126
PCT Pub. Date: Dec. 1, 2011

(65) Prior Publication Data
US 2013/0086606 A1   Apr. 4, 2013

(30) Foreign Application Priority Data

May 26, 2010   (CN) .......................... 2010 1 0192005

(51) Int. Cl.
*H04N 7/167*        (2011.01)
*H04L 29/06*        (2006.01)
*H04N 21/258*       (2011.01)
*H04N 21/4408*      (2011.01)
*H04N 21/418*       (2011.01)

(52) U.S. Cl.
CPC ...... *H04N 21/25816* (2013.01); *H04N 21/4408* (2013.01); *H04N 21/4181* (2013.01); *H04L 63/0428* (2013.01); *H04N 7/167* (2013.01)
USPC ................ 725/31; 725/67; 725/117; 713/168

(58) Field of Classification Search
USPC ................... 725/25, 26, 31, 67, 117; 713/168
See application file for complete search history.

(56) References Cited

U.S. PATENT DOCUMENTS 6,286,103 B1 * 9/2001 Maillard et al. ................ 726/26
6,859,536 B1   2/2005 Kori (Continued)

FOREIGN PATENT DOCUMENTS

| CN | 1275032 A | 11/2000 |
| CN | 1549595 A | 11/2004 |
| CN | 1868187 A | 11/2006 |

OTHER PUBLICATIONS

International Search Report for International Application No. PCT/CN2010/076049 mailed Mar. 3, 2011.

*Primary Examiner* — Jason Salce
(74) *Attorney, Agent, or Firm* — Pearl Cohen Zedek Latzer Baratz LLP

(57) ABSTRACT

The disclosure provides an information transmission method, system and data card, wherein the method comprises: a sender scrambling original information in a predetermined scrambling way, and sending scrambled information to a receiver; the receiver receiving the scrambled information, and descrambling the scrambled information in a predetermined descrambling way to obtain the original information, wherein the predetermined scrambling way corresponds to the predetermined descrambling way. In accordance with the disclosure, contents to be transmitted are scrambled and the scrambled contents are sent to the receiver, and the receiver can restore the transmitted contents by performing descrambling according to the scrambling way used by the sender. The disclosure can avoid the transmitted contents from being monitored, as well as avoid the keys from being stolen; therefore, the security of the transmitted contents is effectively improved.

7 Claims, 3 Drawing Sheets

(56) References Cited

U.S. PATENT DOCUMENTS

| | | |
|---|---|---|
| 2003/0174844 A1* | 9/2003 | Candelore .................... 380/277 |
| 2006/0137015 A1* | 6/2006 | Fahrny et al. .................. 726/26 |
| 2007/0033396 A1 | 2/2007 | Zhang |
| 2007/0143784 A1* | 6/2007 | Kubota et al. .................. 725/31 |
| 2007/0143862 A1* | 6/2007 | Kim ................................ 726/31 |
| 2010/0180291 A1* | 7/2010 | Kahn et al. ..................... 725/31 |

* cited by examiner

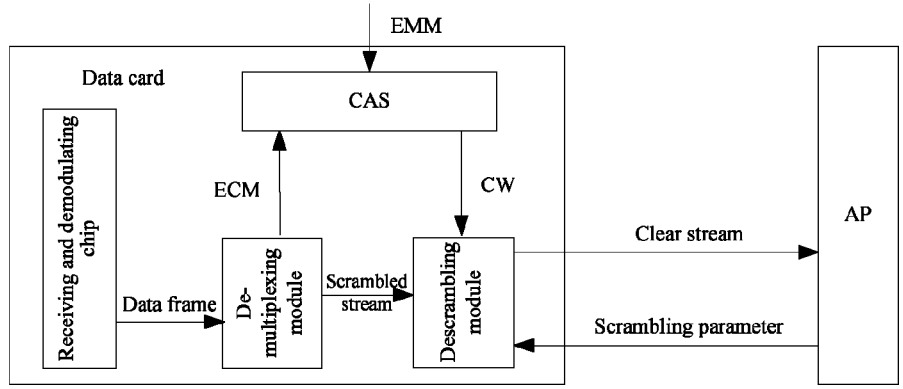

Fig. 1 (Prior Art)

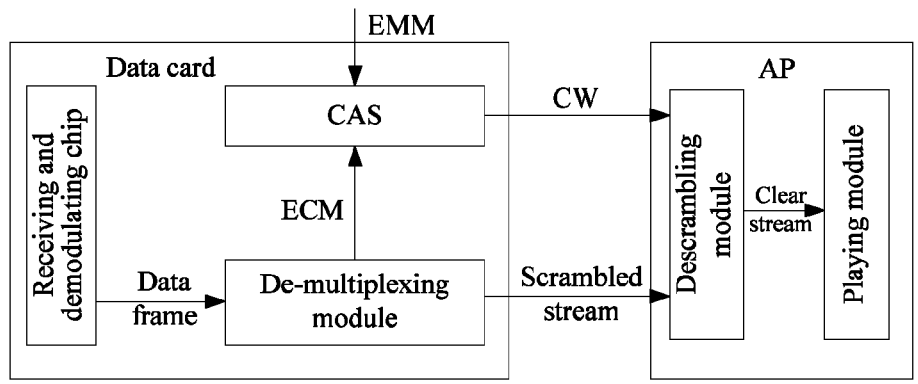

Fig. 2 (Prior Art)

```
When a sender and a receiver perform information
transmission through a non-secure transport protocol, the
sender scrambles original information in a predetermined      — S301
scrambling way, and sends scrambled information to the
                        receiver
```

```
The receiver receives the scrambled information, and
     descrambles the scrambled information in a
 predetermined descrambling way to obtain the original        — S303
information, wherein the predetermined scrambling way
   corresponds to the predetermined descrambling way
```

Fig. 3

INFORMATION TRANSMISSION METHOD, SYSTEM AND DATA CARD

CROSS-REFERENCE TO RELATED APPLICATIONS

This application is a National Phase Application of PCT International Application No. PCT/CN2010/076049, International Filing Date Aug. 17, 2010, claiming priority of Chinese Patent Application No. 2010 10192005.0, filed May 26, 2010, which is hereby incorporated by reference.

FIELD OF THE INVENTION

The disclosure relates to the field of data network communication, and in particular to an information transmission method, system and data card.

BACKGROUND OF THE INVENTION

With the rapid development of digital mobile multimedia broadcasting technology (e.g., mobile TV technology), mobile multimedia broadcasting terminal users are provided with a lot of services, such as advertisement, weather forecast, news, sports, variety, multimedia radio play, movie and other programs. The users can select service programs of mobile multimedia broadcasting according to their own hobbies.

A data card is a data service device used on a computer. The users can use mobile data services and receive multimedia messages through the data card. Moreover, multimedia play can be realized by adding a broadcast signal receiving chip on the data card. In addition, multiple functions, such as surfing the Internet and storing, can be integrated and extended on the data card.

In order to realize paid services and personalized services of a mobile multimedia broadcasting system, it is required to scramble program streams, and only authorized users can watch the programs. After being authorized, the users receive scrambled program streams, and descramble the program streams, and then programs can be played. At present, when receiving the scrambled program streams through the data card, the following two solutions are mainly adopted, and the two solutions are described below with reference to FIG. 1 and FIG. 2.

Solution 1: a system architecture as shown in FIG. 1 is composed of a data card and an Application Processor (AP), wherein the data card mainly comprises a receiving and demodulating chip, a descrambling module, a demultiplexing module and a Conditional Access System (CAS); the AP can be a terminal, such as a personal computer, a Personal Digital Assistant (PDA) and a netbook, and the AP comprises a player module. As shown in FIG. 1, the specific implementation is that: the receiving and demodulating chip is responsible for receiving and demodulating a digital broadcasting signal, namely the scrambled program stream, to obtain a data frame, and sends the data frame to the demultiplexing module; then, the demultiplexing module performs demultiplexing to the data frame to obtain a scrambled media data block and Entitlement Control Message (ECM), sends the obtained ECM to the CAS, and sends the scrambled media data block to the descrambling module; an Entitlement Management Message (EMM) is sent to the CAS through the transmission of a broadcast channel or an interactive channel (FIG. 1 shows the transmission through the interactive channel), and then, the CAS calculates a Control Word (CW) according to the EMM and the ECM, and then sends the CW to the descrambling module; the descrambling module uses the CW to descramble the scrambled media data block to obtain a clear stream, and sends the clear stream to the AP through a USB port; the AP decodes and plays the clear stream, wherein the transport protocol of the clear stream from the data card to the AP can adopt a non-secure transport protocol, for example, a common USB transport protocol (e.g., a common USB2.0).

It can be seen that in the above processing, for the security of keys, although the descrambling process is performed at the data card side, because the transport protocol of the clear stream from the data card to the AP adopts the common USB transport protocol, media contents transmitted based on the protocol cannot be protected; if there is a third party performing operations of monitoring, copying and the like to the USB port at this point, then media contents will be illegally copied and propagated.

Solution 2: a system architecture shown in FIG. 2 is still composed of a data card and an AP, but the descrambling module is set at the AP side, then the data card mainly comprises the receiving and demodulating chip, the demultiplexing module and the CAS, and the AP mainly comprises the descrambling module and the playing module. In this case, the specific implementation is that: the receiving and demodulating chip is responsible for receiving and demodulating the digital broadcasting signal to obtain the data frame, and sends the data frame to the demultiplexing module; then, the demultiplexing module performs demultiplexing to the data frame to obtain the scrambled media data block and the ECM, sends the obtained ECM to the CAS, and sends the scrambled media data block to the descrambling module at the AP side through the USB port; the EMM is sent to the CAS through the transmission of the broadcast channel or the interactive channel (FIG. 2 shows the transmission through the interactive channel), and then, the CAS calculates the CW according to the EMM and the ECM, and sends the CW to the descrambling module at the AP side through the USB port; the descrambling module uses the CW to descramble the scrambled media data block to obtain the clear stream, and sends the clear stream to the playing module, and then the playing module plays the clear stream. It can be seen that the media data block and the CW are separately sent to the AP side. Thus, after the scrambling is set at the AP side, although media contents transmitted through the USB port are scrambled, because the CW itself is easily monitored and intercepted, the security of keys is very low; correspondingly, the security of transmitted media contents is also low.

Furthermore, there are also problems similar to that above existing between other senders and receivers which have a transmitting and receiving relation and interact based on a non-secure transport protocol.

Aiming at the problem in relevant technologies that the data transmission based on the non-secure transport protocol cannot give consideration to both key security and content security, which causes transmitted contents to be easily stolen, no effective solution has been presented.

SUMMARY OF THE INVENTION

Aiming at the problem in relevant technologies that the data transmission based on the non-secure transport protocol cannot give consideration to both key security and content security, which causes transmitted contents to be easily stolen, the disclosure provides an information transmission method and system, and a data card, which can decrease the loss probability of security data.

The technical solutions of the disclosure are implemented as follows.

The information transmission method comprises:

a sender scrambling original information in a predetermined scrambling way, and sending scrambled information to a receiver; and the receiver receiving the scrambled information, and descrambling the scrambled information in a predetermined descrambling way to obtain the original information;

wherein the predetermined scrambling way corresponds to the predetermined descrambling way.

A non-secure transport protocol is adopted to perform information transmission between the sender and the receiver, wherein the non-secure transport protocol means a protocol in which there is a risk that a communication port is monitored; the receiver is a terminal device, and the sender is any device that sends information to the terminal device through the non-secure transport protocol.

The sender is a data card, the process of the sender scrambling the original information in the predetermined scrambling way comprises: the data card obtaining a clear stream, and scrambling the clear stream in the predetermined scrambling way to obtain a scrambled stream.

The process of obtaining the clear stream comprises: receiving and demodulating a digital broadcasting signal to obtain a data frame; performing demultiplexing to the data frame to obtain a scrambled media data block and an Entitlement Control Message (ECM); using the ECM and a received Entitlement Management Message (EMM) to calculate a Control Word (CW); and using the CW to descramble the scrambled media data block to obtain the clear stream.

The process of the receiver descrambling the scrambled information in the predetermined descrambling way to obtain the original information comprises: the receiver descrambling the scrambled stream in the predetermined descrambling way to obtain the clear stream.

The non-secure transport protocol is one of the following: a USB transport protocol, an RS232 serial port communication protocol, and a Bluetooth communication protocol.

An information transmission system comprises:

a sending device, which is configured to scramble original information in a predetermined scrambling way, and send scrambled information to a terminal device; and the terminal device, which is configured to receive the scrambled information, and descramble the scrambled information in a predetermined descrambling way to obtain the original information;

wherein the predetermined scrambling way corresponds to the predetermined descrambling way.

A non-secure transport protocol is adopted to perform information transmission between the sending device and the terminal device, wherein the non-secure transport protocol means a protocol in which there is a risk that a communication port is monitored.

The non-secure transport protocol is one of the following: a USB transport protocol, an RS232 serial port communication protocol, and a Bluetooth communication protocol.

A data card comprises:

an obtaining module, which is configured to obtain a clear stream;

a scrambling processing module, which is configured to scramble the clear stream in a predetermined scrambling way to obtain a scrambled stream; and a sending module, which is configured to send the scrambled stream to a terminal device, so that the terminal device descrambles the scrambled stream in a predetermined descrambling way to obtain the clear stream;

wherein the predetermined scrambling way corresponds to the predetermined descrambling way.

The obtaining module comprises:

a receiving sub-module, which is configured to receive a digital broadcasting signal and an EMM;

a demodulating sub-module, which is configured to demodulate the digital broadcasting signal to obtain a data frame;

a demultiplexing sub-module, which is configured to perform demultiplexing to the data frame to obtain a scrambled media data block and an ECM;

a calculating sub-module, which is configured to use the ECM and the EMM to calculate a CW; and a descrambling sub-module, which is configured to use the CW to descramble the scrambled media data block to obtain the clear stream.

With the above technical solutions of the disclosure, the contents to be transmitted are scrambled and the scrambled contents are sent to the receiver, and the receiver can restore the transmitted contents by performing descrambling according to the scrambling way used by the sender. In this way, the transmitted contents are prevented from being monitored, and the keys are prevented from being stolen; therefore, the security of the transmitted contents is effectively improved.

Furthermore, the above technical solutions provided by the disclosure are applicable to multiple types of information transmission between a sender and a receiver; besides being applicable to a situation that the sender and the receiver perform information transmission through the non-secure transport protocol, the solutions provided by the disclosure can be used for further guaranteeing the security of the transmission, even if the transport protocol between two transmission parties already has a security mechanism.

BRIEF DESCRIPTION OF THE DRAWINGS

FIG. 1 shows a block diagram of system architecture of existing technical solution 1;

FIG. 2 shows a block diagram of system architecture of existing technical solution 2;

FIG. 3 shows a flowchart of steps of an information transmission method according to an embodiment of the disclosure;

DETAILED DESCRIPTION OF THE EMBODIMENTS

Figure 4:
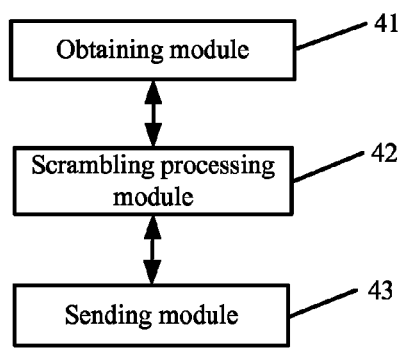
FIG. 4 shows a diagram of signaling transmission of a data card after adopting the information transmission method according to an embodiment of the disclosure.

Aiming at the problem in relevant technologies that the data transmission based on a non-secure transport protocol cannot give consideration to both key security and content security, which causes transmitted contents to be easily stolen, the embodiments of the disclosure provides the following technical solutions: contents to be transmitted are scrambled and the scrambled contents are sent to a receiver, and the receiver can restore transmitted contents by performing descrambling according to a scrambling way used by the sender. In this way, the transmitted contents are prevented from being monitored, and the keys are prevented from being stolen; therefore, the security of the transmitted contents is effectively improved.

The embodiments of the disclosure are described below with reference to specific embodiments.

FIG. 3 shows a flowchart of steps of the information transmission method according to an embodiment of the disclosure. As shown in FIG. 3, the method comprises the following steps.

Step 301: a sender scrambles original information in a predetermined scrambling way, and sends the scrambled information to a receiver.

The sender and the receiver can perform the information transmission through a non-secure transport protocol.

The non-secure transport protocol means a protocol in which a communication port may be monitored. No matter whether a protocol itself has a security mechanism, as long as it is possible that a port is illegally monitored by a third party when communication is performed based on the protocol, the protocol is regarded as a non-secure transport protocol, for example, the non-secure transport protocol can be one of the following: a USB transport protocol, an RS232 serial port communication protocol, and a Bluetooth communication protocol.

Step 303: the receiver receives the scrambled information, and descrambles the scrambled information in a predetermined descrambling way to obtain the original information, wherein the predetermined scrambling way corresponds to the predetermined descrambling way.

For example, the solution provided by the embodiment of the disclosure can be implemented by using an Advanced Encryption Standard (AES) encryption algorithm. The AES is a symmetric block cipher, and can meet the requirements of high confidential communication. In specific implementation, an AES 128 uses one 128-bit key to encrypt one 128-bit data block (clear stream) to form one 128-bit data block (scrambled stream); wherein encryption and decryption use the same key, and can be implemented by presetting keys in the sender and the receiver or using a key agreement mechanism.

The receiver can be a terminal device, such as a personal computer, a PDA, and a netbook. The sender can be any device that sends information to the terminal device through the non-secure transport protocol, for instance, a data card, a USB flash disk, and a mobile phone. The information sent from the sender to the receiver can be either common information or multimedia information.

In a manner that the contents to be transmitted are scrambled and the scrambled contents are sent to the receiver, and the receiver can restore transmitted contents by performing descrambling according to the scrambling way used by the sender. In this way, the transmitted contents are prevented from being monitored, and the keys are prevented from being stolen; therefore, the security of the transmitted contents is effectively improved.

Under a condition that the protocol on which the transmission is based is the USB transport protocol, insecurities caused by the USB transport protocol can be prevented by scrambling media contents in plaintext form before transmitting, thereby eliminating hidden dangers of insecurity of the key transmission, and avoiding the problem that media contents are stolen during the transmission.

Furthermore, the solutions provided by the embodiment of the disclosure can be applicable to multiple types of information transmission between a sender and a receiver; in addition, even if the transmission protocol on which the sender and the receiver are based has a certain security measure, the solutions provided by the embodiment of the disclosure can also be adopted to further improve the security of the transmission.

For describing conveniently, the embodiment of the disclosure is described below by taking that the sender is a data card and the receiver is a terminal device for example. Note that, for other types of senders that send information to the terminal device through the non-secure transport protocol, the embodiment of the disclosure can still be realized, and this situation falls within the scope of the disclosure.

For describing clearly, composition structure of the data card is described. FIG. 4 shows a block diagram of composition structure of the data card according to an embodiment of the disclosure. As shown in FIG. 4, the data card comprises:

an obtaining module 41, which is configured to obtain a clear stream;

a scrambling processing module 42, which is configured to scramble the clear stream in a predetermined scrambling way to obtain a scrambled stream; and a sending module 43, which is configured to send the scrambled stream to the terminal device, so that the terminal device descrambles the scrambled stream in a predetermined descrambling way to obtain the clear stream; wherein the predetermined scrambling way corresponds to the predetermined descrambling way.

The obtaining module 41 specifically comprises:

a receiving sub-module (not shown in the figure), which is configured to receive a digital broadcasting signal and an EMM;

a demodulating sub-module (not shown in the figure), which is configured to demodulate the digital broadcasting signal to obtain a data frame;

a demultiplexing sub-module (not shown in the figure), which is configured to perform demultiplexing to the data frame to obtain a scrambled media data block and an ECM;

a calculating sub-module (not shown in the figure), which is configured to use the ECM and the EMM to calculate a CW; and a descrambling sub-module (not shown in the figure), which is configured to use the CW to descramble the scrambled media data block to obtain the clear stream.

It can be seen from the above description that in the embodiment of the disclosure, descrambling operation is performed at the data card side to obtain the clear stream, a private scrambling module, namely the scrambling processing module 42, is added at the data card side, and a private descrambling module is added at an AP side of the terminal device. After descrambling the media contents at the data card side, the clear stream is obtained; the clear stream is scrambled with a private algorithm, and then the scrambled clear stream is transmitted to the AP through a USB port. After the AP receives the scrambled clear stream, first, the scrambled clear stream is descrambled with a private algorithm to obtain the clear stream, and then the clear stream is decoded and played.

Through the data card provided by the embodiment of the disclosure, the contents to be transmitted can be scrambled, and the scrambled contents can be sent to the receiver, so that the transmitted contents can be restored by descrambling the scrambled contents according to the scrambling way used by the sender; therefore, the transmitted contents are prevented from being monitored, the keys are prevented from being stolen, which effectively improves the security of the transmitted contents.

Figure 5:
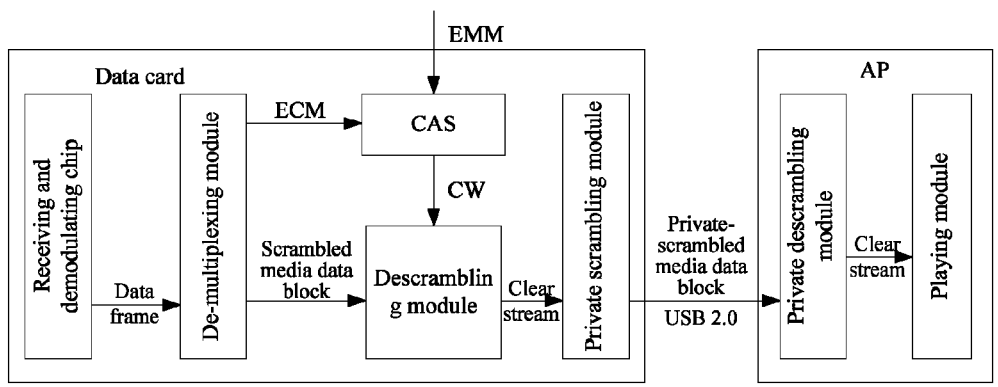
FIG. 5 shows a block diagram of system architecture according to an embodiment of the disclosure.

FIG. 5 shows a block diagram of system architecture according to an embodiment of the disclosure. As shown in FIG. 5, the system comprises a data card and an AP (which is in a terminal device). The data card comprises a receiving and demodulating chip (namely the above-mentioned receiving sub-module and demodulating sub-module), a demultiplexing module (namely the above-mentioned demultiplexing sub-module), a descrambling module (namely the above-mentioned descrambling sub-module), a CAS (namely the above-mentioned calculating sub-module) and a private scrambling module (namely the above-mentioned scrambling processing module). The AP comprises a private descrambling module and a playing module.

Figure 6:
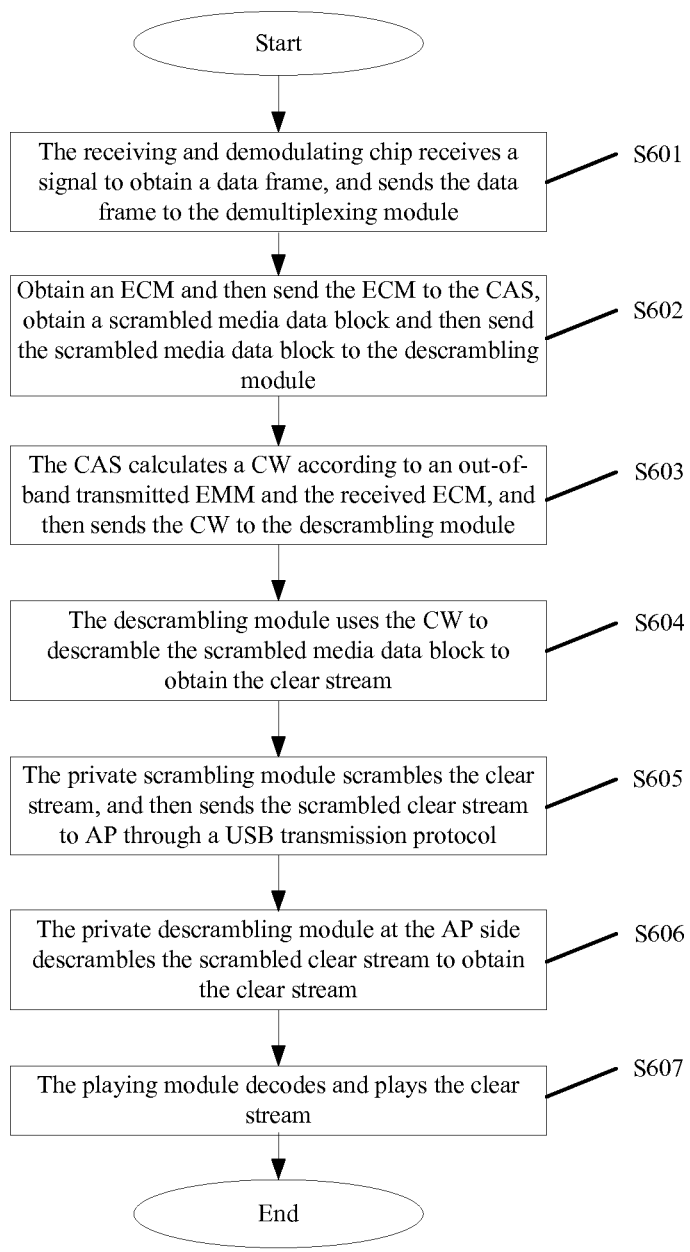
FIG. 6 shows a detailed processing flowchart of an information transmission method according to an embodiment of the disclosure.

An embodiment of the disclosure is described below with reference to the system shown in FIG. 5. FIG. 6 shows a detailed processing flowchart of the information transmission method according to the embodiment of the disclosure. As shown in FIG. 6, the method comprises the following steps.

Step 601: the receiving and demodulating chip receives and demodulates a digital broadcasting signal to obtain a data frame, and sends the data frame to the demultiplexing module.

Step 602: the demultiplexing module performs demultiplexing to the data frame to obtain a scrambled media data block and an ECM, sends the obtained ECM to the CAS, and sends the scrambled media data block to the descrambling module.

Step 603: the CAS obtains an EMM through the transmission of a broadcast channel or an interactive channel, then calculates a CW according to the out-of-band transmitted EMM and the received ECM, and sends the CW to the descrambling module.

Step 604: the descrambling module uses the CW to descramble the scrambled media data block to obtain the clear stream, and sends the clear stream to the private scrambling module.

Step 605: the private scrambling module scrambles the received clear stream with a private algorithm to obtain a scrambled stream, and sends the scrambled stream to the AP through the USB transmission protocol.

Step 606: the private descrambling module at the AP side descrambles the received scrambled stream with a private algorithm to obtain the clear stream, and sends the clear stream to the playing module.

Step 607: the playing module at the AP side decodes and plays the clear stream.

Figure 7:
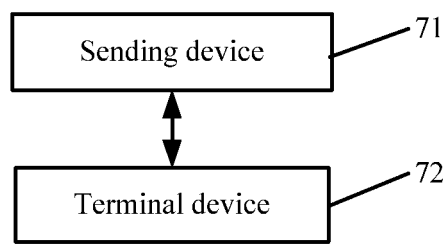
FIG. 7 shows a diagram of composition structure and connection relation of an information transmission system according to an embodiment of the disclosure.

FIG. 7 shows a diagram of composition structure of an information transmission system according to an embodiment of the disclosure. The information transmission system comprises: a sending device 71 and a terminal device 72, wherein the sending device 71 and the terminal device 72 can perform information transmission therebetween through a non-secure transport protocol. The non-secure transport protocol means a protocol in which a communication port may be monitored; no matter if the protocol itself has a security mechanism, as long as it is possible that a port is illegally monitored by a third party when communication is performed based on the protocol, the protocol is regarded as a non-secure transport protocol and can be, for example, one of the following: a USB transport protocol, an RS232 serial port communication protocol, and a Bluetooth communication protocol.

The sending device 71 is configured to scramble original information in a predetermined scrambling way, and send scrambled information to a receiver.

The terminal device 72 is configured to receive the scrambled information, and descramble the scrambled information in a predetermined descrambling way to obtain the original information; wherein the predetermined scrambling way corresponds to the predetermined descrambling way.

Through the information transmission system provided by the embodiment of the disclosure, the sending device can scramble the contents to be transmitted, and send the scrambled contents to the terminal device; the terminal device can restore the transmitted contents after descrambling the scrambled contents according to the scrambling way used by the sender; therefore, the transmitted contents are prevented from being monitored, and the keys are prevented from being stolen, which effectively improves the security of the transmitted contents.

FIG. 7 shows a system corresponding to the above-mentioned method. The operation process and the operation principle of the system has been described in description of the method in detail, so it will not be repeated here, just referring to the description of the corresponding part in the method.

Note that, although description is given before by taking the transmission process between the data card and the AP side for example, the disclosure is not limited to that; similar processes can also be applied to the interaction between other senders and receivers, and they are not listed here.

In conclusion, with the above-mentioned technical solutions of the embodiments of the disclosure, the contents to be transmitted can be scrambled and the scrambled contents can be sent to the receiver, and the receiver can restore the transmitted contents by performing descrambling according to the scrambling way used by the sender; therefore, the transmitted contents are prevented from being monitored, and the keys are prevented from being stolen, which effectively improves the security of the transmitted contents. Besides, the above-mentioned solutions are applicable to multiple types of information transmission between a sender and a receiver; even if the transport protocol between two transmission parties already has a security mechanism, the solutions provided by the embodiments of the disclosure can be used for further guaranteeing the security of the transmission.

The above are only the preferable embodiments of the disclosure and not intended to limit the disclosure; any modifications, equivalent replacements, improvements and the like within the principle of the disclosure shall fall within the scope of the disclosure.

What is claimed is:

1. An information transmission method, comprising:
   a sender receiving a digital broadcasting signal and an Entitlement Management Message (EMM), demodulating the digital broadcasting signal to obtain a data frame, performing demultiplexing to the data frame to obtain a scrambled media data block and an Entitlement Control Message (ECM), using the ECM and the EMM to calculate a Control Word (CW), and using the CW to descramble the scrambled media data block to obtain a clear stream
   the sender scrambling the clear stream in a predetermined scrambling way to obtain a scrambled stream, and sending the scrambled stream to a receiver; and
   the receiver receiving the scrambled stream, and descrambling the scrambled stream in a predetermined descrambling way to obtain the clear stream;
   wherein the sender is a data card, the receiver is a terminal device, the predetermined scrambling way corresponds to the predetermined descrambling way, and the predetermined scrambling way and the predetermined descrambling way are, respectively, encryption and decryption using the same key, wherein the key is preset in the sender and the receiver, or is obtained by using a key agreement mechanism.

2. The information transmission method according to claim 1, wherein a non-secure transport protocol is adopted to perform information transmission between the sender and the receiver, wherein the non-secure transport protocol means a protocol in which there is a risk that a communication port is monitored;

the receiver is a terminal device, and the sender is any device that sends information to the terminal device through the non-secure transport protocol.

3. The information transmission method according to claim 2, wherein the non-secure transport protocol is one of the following: a USB transport protocol, an RS232 serial port communication protocol, and a Bluetooth communication protocol.

4. An information transmission system, comprising:

a sending device configured to receive a digital broadcasting signal and an Entitlement Management Message (EMM), demodulate the digital broadcasting signal to obtain a data frame, perform demultiplexing to the data frame to obtain a scrambled media data block and an Entitlement Control Message (ECM), use the ECM and the EMM to calculate a Control Word (CW), use the CW to descramble the scrambled media data block to obtain a clear stream, scramble the clear stream in a predetermined scrambling way to obtain a scrambled stream, and send the scrambled stream to a terminal device; and the terminal device configured to receive the scrambled stream, and descramble the scrambled stream in a predetermined descrambling way to obtain the clear stream;

wherein the sending device is a data card, the predetermined scrambling way corresponds to the predetermined descrambling way, and the predetermined scrambling way and the predetermined descrambling way are, respectively, encryption and decryption using the same key, wherein the key is preset in the sender and the receiver, or is obtained using a key agreement mechanism.

5. The information transmission system according to claim 4, wherein a non-secure transport protocol is adopted to perform information transmission between the sending device and the terminal device, wherein the non-secure transport protocol means a protocol in which there is a risk that a communication port is monitored.

6. The information transmission system according to claim 5, wherein the non-secure transport protocol is one of the following: a USB transport protocol, an RS232 serial port communication protocol, and a Bluetooth communication protocol.

7. A data card, comprising:

an obtaining module configured to obtain a clear stream, wherein the obtaining module comprises: a receiving sub-module, which is configured to receive a digital broadcasting signal and an Entitlement Management Message (EMM); a demodulating sub-module, which is configured to demodulate the digital broadcasting signal to obtain a data frame; a demultiplexing sub-module, which is configured to perform demultiplexing to the data frame to obtain a scrambled media data block and an Entitlement Control Message (ECM); a calculating sub-module, which is configured to use the ECM and the EMM to calculate a Control Word (CW); and a descrambling sub-module, which is configured to use the CW to descramble the scrambled media data block to obtain the clear stream;

a scrambling processing module configured to scramble the clear stream in a predetermined scrambling way to obtain a scrambled stream; and a sending module configured to send the scrambled stream to a terminal device, so that the terminal device descrambles the scrambled stream in a predetermined descrambling way to obtain the clear stream;

wherein the predetermined scrambling way corresponds to the predetermined descrambling way, and the predetermined scrambling way and the predetermined descrambling way are, respectively, encryption and decryption using the same key, wherein the key is preset in the data card and the terminal device or is obtained by using a key agreement mechanism.

\* \* \* \* \*